United States Patent [19]

Thulin

[11] Patent Number: 4,648,821

[45] Date of Patent: Mar. 10, 1987

[54] APPARATUS FOR CO-EXTRUSION OF A DOUGH MASS HAVING DISSIMILAR INNER AND OUTER PORTIONS

[75] Inventor: Robert Thulin, Wyckoff Rt., N.J.

[73] Assignee: Nabisco Brands, Inc., Parsippany, N.J.

[21] Appl. No.: 646,683

[22] Filed: Aug. 31, 1984

[51] Int. Cl.$^4$ .............................................. A21C 11/16
[52] U.S. Cl. ................................. 425/133.1; 425/465; 426/283; 426/516
[58] Field of Search ...................... 425/130, 131.1, 132, 425/133.1, 133.5, 224, 461, 462, 465, 377, 376 P; 99/450.6, 450.7; 426/502, 503, 512, 516, 283

[56] References Cited

U.S. PATENT DOCUMENTS

| | | | |
|---|---|---|---|
| 2,389,084 | 11/1945 | Routh | 425/131.1 |
| 2,927,542 | 3/1960 | Moser | 425/131.1 |
| 3,135,226 | 6/1964 | Clark | 425/131.1 |
| 3,196,809 | 7/1965 | Nelson et al. | 425/131.1 |
| 3,213,808 | 10/1965 | Schafer | 425/131.1 |
| 3,615,147 | 10/1971 | Hayashi | 425/133.1 |
| 3,778,209 | 12/1973 | Wallace et al. | 425/132 |
| 4,416,910 | 11/1983 | Hayashi et al. | 426/502 |
| 4,421,776 | 12/1983 | Brinkers et al. | 426/502 |
| 4,447,458 | 5/1984 | Roth et al. | 425/130 |
| 4,511,318 | 4/1985 | Kolodesh et al. | 425/133.1 |

OTHER PUBLICATIONS

Middleman, *Fundamentals of Polymer Processing*, McGraw Hill Book Company, N.Y., 1977, pp. 188–191.

Primary Examiner—Jay H. Woo
Assistant Examiner—J. Fortenberry
Attorney, Agent, or Firm—Richard Kornutik

[57] ABSTRACT

An exit orifice of an outer extrusion port of a coextrusion apparatus for producing a composite doughy rope-like extrudate product has a D-shaped cross-section with a straight boundary line or edge located at an upstream side of the exit orifice relative to the direction of motion of a conveyor for taking up and transporting the extrudate product. The D-shaped cross-section of the exit orifice results in an extrudate product having on one side a flat surface which engages the surface of the conveyor upon deposition of the product thereon. An inner extrusion port recessed by a distance from the outer extrusion port has an exit orifice with a substantially oval cross-section taking the form of a pair of semicircular end portions joined by a rectangular central portion. The cross-sections of the exit orifices are elongated in a direction extending parallel to the direction of motion of the conveyor. The outer extrusion port has a D-shaped edge for causing the tumbling of particles in an outer doughy mass extruded between the inner and outer extrusion ports. The outer extrusion port has a land surface extending parallel to the direction of extrudate flow for peeling off dough surface layers adhering to particles tumbled partially through the outer surface of the extrudate mass.

13 Claims, 6 Drawing Figures

APPARATUS FOR CO-EXTRUSION OF A DOUGH MASS HAVING DISSIMILAR INNER AND OUTER PORTIONS

FIELD OF INVENTION

The present invention relates to the manufacture of edible products having dissimilar inner and outer portions. More particularly, the present invention is directed to the manufacture of food products wherein an inner dough portion is enveloped by an outer dough portion.

BACKGROUND OF THE INVENTION

The types of products to which the present invention relates include baked goods produced from dough pieces having an outer layer of farinaceous dough and a core which may be a dissimilar dough or another material such as a jam, cream, puree, paste, or other extrudable form of fruit, cheese, meat, vegetable, confection or other edible substance. In those products where the core is also a dough, the inner and outer doughs would be advantageously dissimilar in composition so as to produce different tastes, colors, appearances, textures, consistencies, or the like in the inner and outer portions of the baked product. The present invention is particularly useful in producing such baked goods having particulate matter, such as chocolate chips, candied fruit, nuts, raisins, and the like, in the outer portion.

In the past, products having different inner and outer portions have been formed by concentrically extruding an extrudate rope as shown in U.S. Pat. No. 3,572,259 to Hayashi.

An automatic machine for making filled baked goods is described in U.S. Pat. No. 3,196,810 to Roth. In this patent, a plurality of dies dispose flavoring material within a dough. U.S. Pat. No. 3,778,209 to Wallace et al. discloses an apparatus for forming a food extrusion in which an inner meat food is totally enrobed by an outer moldable food by using a co-extrusion nozzle and a pair of augers to force food products through the co-extrusion nozzle from a respective pair of food hoppers. Augers are particularly useful for the extrusion of foods, such as dough, in order to achieve a consistent quality, reliability and high efficiency in the high speed manufacture of snacks such as cookies, chocolate layered foods and the like.

In the manufacture of co-extruded food substances, it is common to require that the outer food substance encapsulates or enrobes an inner food substance. In U.S. Pat. Nos. 3,778,209 to Wallace et al. and 3,249,068 to Gembicki, the enrobing action is obtained by controlling the motion of a plunger or piston used in connection with the feeding of the food material to be encapsulated. In U.S. Pat. No. 4,251,201 to Krysiak, an enrobed food piece is produced with an apparatus that includes specially sequenced feed mechanisms used to co-extrude an inner and outer food product from coaxial dies in combination with a sequence-coordinated iris-shaped cut-off valve that is closely mounted to the discharge ports of the extrusion dies. The iris valve cuts the co-extrusion just at a time when the feed of both the inner filler and outer enrobing foods is interrupted and the space in which the valve acts is essentially filled with the outer enrobing food. This technique appears to depend upon a relatively easy flowability of the outer food substance so as to coat the rear of the inner food while the iris valve is about to close and appears limited in operating speed because the feed of both inner and outer foods must be interrupted for each food piece manufactured.

More recently, relatively high speed methods and apparatuses have been developed whereby an inner dough coextruded with an outer dough is enrobed by severing the outer dough with a blunt severing edge or a severing element which simultaneously draws the outer dough over the inner dough on both sides of a severed element to form a fully enrobed food piece. See, for example, commonly assigned U.S. patent application Ser. No. 06/507,401 now abandoned.

Commonly assigned U.S. patent application Ser. No. 630,126, filed July 12, 1984, now U.S. Pat. No. 4,579,744, discloses a method and apparatus which facilitates inclusion of particulate matter in the outer portion of a co-extruded dough rope. The apparatus set forth in that application includes an inner extrusion port through which an inner portion of the extrudate material is extruded and an outer extrusion port. The outer extrusion port has a generally annular extrusion orifice greater in cross-sectional area than the extrusion orifice of the inner extrusion port. The inner extrusion port is recessed from the outer extrusion port by a distance sufficient to allow passage of the outer dough, which contains particulate material, between the ports without agglomeration of the particles. Turbulence is induced in the outer dough for causing the particles therein to penetrate the exterior surface of the outer doughy mass, the turbulence being induced by a substantially sharp circular edge formed by the intersection of a generally annular land surface generally parallel with respect to the axis of the outer extrusion port and an annular beveled surface inclined at an angle with respect to the axis of the outer extrusion port.

According to the method and apparatus disclosed in commonly assigned U.S. patent application Ser. No. 630,126, now U.S. Pat. No. 4,579,744, the cylindrical extrudate is deposited on a continuously moving conveyor spaced at a distance from the outer extrusion port. The conveyor transports the extrudate material from the extruding station to a cutting station and from there to a baking station.

At a cutting station a coaxial extrudate rope may be formed into a series of discrete items such as cookies each having an inner portion of one material and an outer portion of another material substantially surrounding and enclosing the inner portion. The cutting and formation of the coaxial extrudate rope into the multiplicity of discrete items may be accomplished by a cylindrical cutter member having a blunt circular lower edge by means of which the outer portion of the extrudate material is dragged downwardly toward the plane of the conveyor upon a downward motion of the cutter member. It has been found that waste material accumulates at the cutting station and that the accumulation is exasperbated by a mispositioning of the extrudate rope upon the conveyor so that the extrudate fails to pass directly below the cutter member at the cutting station.

An object of the present invention is to provide an improved apparatus for the coextrusion of a coaxial extrudate rope-like material having an inner portion and a dissimilar outer portion, the improved apparatus resulting in a reduced amount of waste material at the cutting station.

Another, more particular, object of the present invention is to provide such a co-extrusion apparatus in which the mispositioning of the extrudate material on the moving conveyor is decreased, if not eliminated.

These and other objects of the present invention will be apparent from the following description and claims in conjunction with the drawings.

SUMMARY OF THE INVENTION

The present invention is directed to an improvement in an apparatus useful for forming a continuous food extrudate having an inner portion and a doughy outer portion dissimilar thereto, wherein the inner portion is enveloped by the outer portion. The apparatus comprises an inner extrusion port, an outer extrusion port, a first conduit, a second conduit and a conveyor. The inner extrusion port has an inner exit orifice with a first cross-sectional area through which the inner portion of the extrudate is extruded, while the outer extrusion port has an outer exit orifice with a second cross-sectional area greater than the first cross-sectional area. The inner extrusion port is spaced from the outer extrusion port to define an exit passage between the inner extrusion port and the outer extrusion port. The first conduit communicates with the inner extrusion port for providing the inner portion of the extrudate material thereto, while the second conduit communicates with the exit passage for providing the doughy outer portion thereto, whereby the doughy outer portion passes through the exit passage and envelopes the inner portion extruded through the inner extrusion port. The conveyor is a continuously moving conveyor for receiving the food product upon extrusion thereof through the inner and the outer extrusion ports. The motion of the conveyor has an upstream side and a downstream side with respect to the extrusion ports, the upstream and downstream sides defining a direction substantially perpendicular to the direction of extrudate flow through the extrusion ports.

In accordance with the present invention the outer exit orifice, i.e., the exit orifice of the outer extrusion port, has a cross-section defining a straight base line at the upstream side as defined by the direction of conveyor motion. The shape of the cross-section of the outer exit orifice results in the production of an extrudate material having a similar cross-section, whereby the food product is positioned on the conveyor.

In accordance with a particular feature of the present invention, the cross-section of the outer exit orifice has a straight line boundary at the upstream side (relative to the conveyor). The straight line boundary extends substantially perpendicularly to the direction of motion of the conveyor as seen in an orthographic projection of the outer exit orifice onto the conveyor. The straight line boundary of the outer exit orifice ensures that the rope-like food product has a flat surface along one side, this flat surface engaging the surface of the conveyor. In contrast to conventional cylindrical extrudates, which have a tendency to roll or otherwise shift their positions with respect to the conveyor, an extrudate produced by a co-extrusion apparatus having the improvement according to the present invention assumes a fixed position relative to the conveyor upon an initial contact therewith in the region of the extruding station. The flat surface at the upstream side (relative to the direction of conveyor motion) of the extrudate increases the stability of the extrudate upon the conveyor and results in a greatly reduced tendency of various portions of the extrudate to shift their positions relative to the conveyor and to one another.

In accordance with a particular feature of the present invention, the cross-section of the outer exit orifice is D-shaped with a curved boundary at the downstream side opposite the straight line boundary at the upstream side.

Pursuant to another particular feature of the present invention the inner exit orifice, i.e., the exit orifice of the inner extrusion port, has a generally oval cross-section with a length dimension and a width dimension measured substantially perpendicularly thereto. The length dimension is larger than the width dimension and is measured in a direction extending from the upstream side to the downstream side of the extrusion ports relative to the direction of motion of the conveyor. Preferably, the cross-section of the inner exit orifice takes the form of a pair of semicircular end portions joined by a rectangular center portion In addition, the cross-section of the outer exit orifice advantageously has a length dimension larger than the width dimension thereof and larger than the length of the inner exit orifice, the length of the outer exit orifice also being measured perpendicularly to the direction of extrudate flow through the orifice and from the upstream side to the downstream side, as defined by the direction of conveyor motion.

A coaxial extrudate produced by a co-extrusion apparatus incorporating the present invention has, upon deposition of the extrudate on the moving conveyor, a height measured perpendicularly to the surface of the conveyor, which height is greater than the dimension measured parallel to the conveyor surface. Cylindrical extrudates formed by conventional co-extrusion apparatuses invariably have a height dimension which is less than the dimension measured parallel to the conveyor surface, because of the settling of the food product upon deposition thereof on the moving conveyor. The improvement in accordance with the present invention permits a greater control of the geometry of the extrudate on the moving conveyor and thereby facilitates a reduction in waste material at the cutting station.

In accordance with further feature of the present invention, the cross-sectional area of the inner exit orifice is between 0.300 square inch and 0.330 square inch and is preferably approximately 0.318 square inch, while the cross-sectional area of the outer exit orifice is between 0.530 square inch and 0.580 square inch and is preferably approximately 0.571 square inch. In addition, the cross-section of the outer exit orifice has a semicircular end portion on the downstream side and a substantially rectangular portion on the upstream side. Preferably, the length and the width of the inner exit orifice are approximately 0.687 inch and 0.562 inch, respectively, while the length and the width of the outer exit orifice are approximately 0.844 inch and 0.750 inch, respectively.

It is to be noted that the improvement according to the present invention has further applications where a single material such as a doughy food product with or without particulate matter is being continuously extruded and deposited upon a continuously moving conveyor. The present invention can easily be adapted for use in many existing extruding apparatuses without extensive modifications thereto.

DETAILED DESCRIPTION

Figure 1:
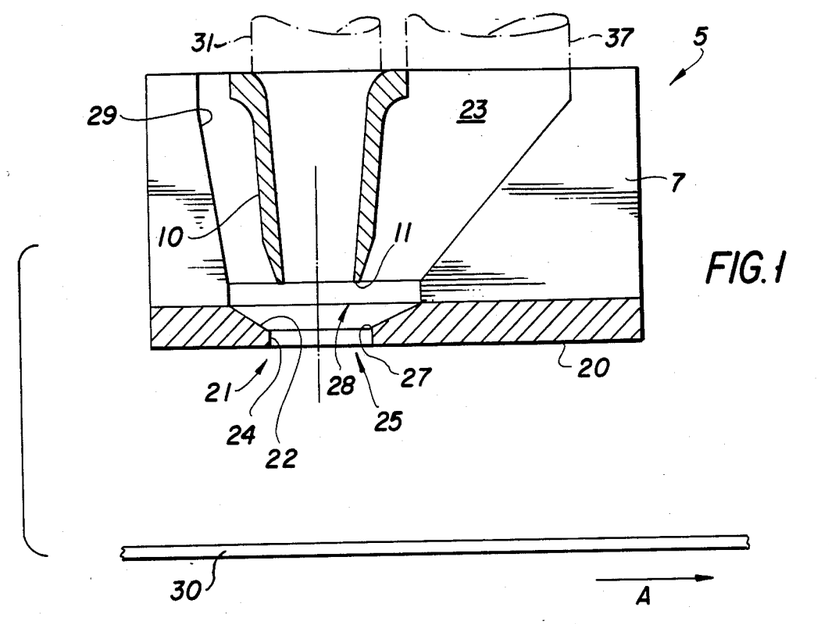
FIG. 1 is a schematic side view, partially in cross-section, of a co-extrusion apparatus incorporating the improvement in accordance with the present invention.

As illustrated in FIG. 1, a co-extrusion apparatus 5 comprises a die casing 7 and an inner filler tube or extrusion conduit 10. The end of inner extrusion conduit 10 terminates with an inner extrusion port 11. Surrounding inner extrusion conduit 10 is an outer extrusion conduit 23 which is defined by the outer wall of inner extrusion conduit 10 and the wall 29 of a die casing 7. Mounted on the bottom of die casing 7 and positioned below inner extrusion port 11 is an extrusion die plate 20 in which is provided an outer extrusion port 21. Positioned below outer extrusion port 21 is a conveyor 30 for receiving and transporting rope-like extrudate material produced by the co-extrusion apparatus to a cutting station and from there to an oven.

Apparatuses for the manufacture of food products having dissimilar inner and outer portions by co-extrusion through concentric inner and outer extrusion nozzles or conduits are themselves well known and do not require detailed discussion.

A first conduit 31 and a second conduit 37, illustrated in phantom in FIG. 1, represent means for feeding the inner doughy mass to filler tube 10 and the outer doughy mass to outer extrusion conduit 23 respectively. Conduits 31 and 37 extend from respective hoppers and the feeding is implemented by auger devices or by pressurized gas, as is well known in the art. As illustrated in FIG. 1, outer extrusion conduit 23 has a greater cross-sectional area on the right hand side of the figure where the outer doughy mass is fed into the outer extrusion conduit. The outer doughy mass surrounds inner filler tube 10 and is forced through an exit passage 28 between inner extrusion port 11 and bottom die plate 20, whereby the outer doughy mass surrounds and envelopes the inner doughy mass extruded through inner extrusion port 11. The composite outer doughy mass enveloping the inner doughy mass is forced or co-extruded through the outer extrusion port 21 of extrusion die 20. The general arrangement of such co-extrusion devices are themselves well known in the art.

As illustrated in FIG. 1, the left periphery of inner extrusion port 11 is positioned in approximate alignment with the left hand side of a land surface 24 of outer extrusion port 21. Such an alignment is found advantageous for producing a satisfactory product when the co-extruded rope-like product having dissimilar outer and inner portions is received and transported away by conveyor 30 moving to the right as indicated by the arrow A in FIG. 1. That is, when conveyor 30 is moving as indicated by the arrow A, best results in the quality of the co-extruded product are not generally obtained by centrally positioning inner extrusion port 11 with respect to outer extrusion port 21. The exact lateral positioning of inner extrusion port 11 respect to outer extrusion port 21 for producing an optimum quality product may vary slightly depending on the composition of the inner and outer doughy masses and the linear speed of conveyor 30 but can be routinely determined in view of the foregoing general guidance. Means (not illustrated) would be provided to laterally move die casing 7 and thereby outer extrusion port 21 with respect to inner extrusion port 11.

Figure 3:
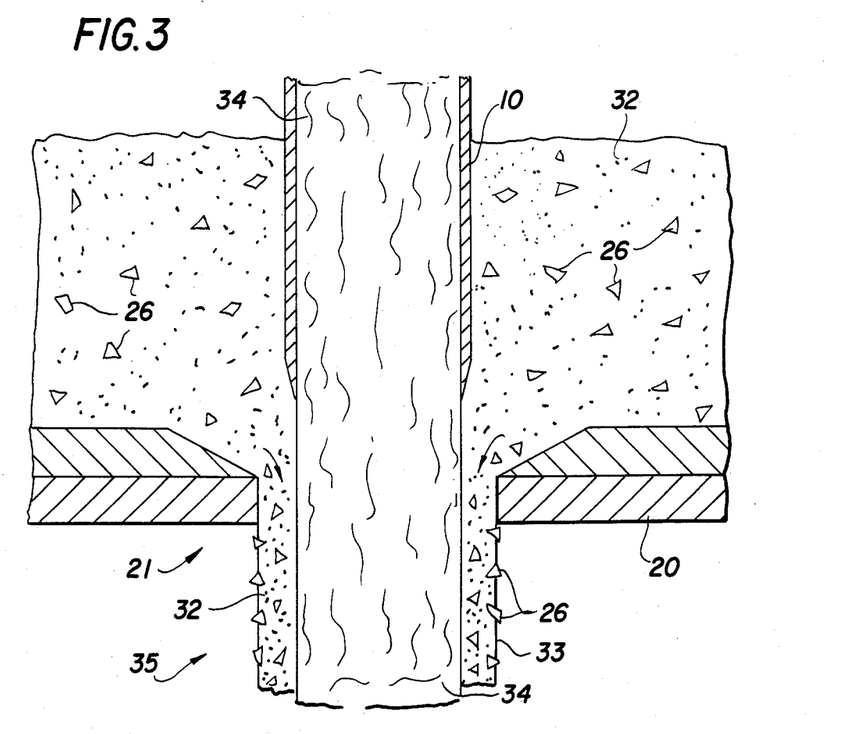
FIG. 3 is a simplified schematic cross-sectional view similar to FIG. 2, which further illustrates an inner doughy mass and outer doughy mass containing particulate material.
Figure 5:
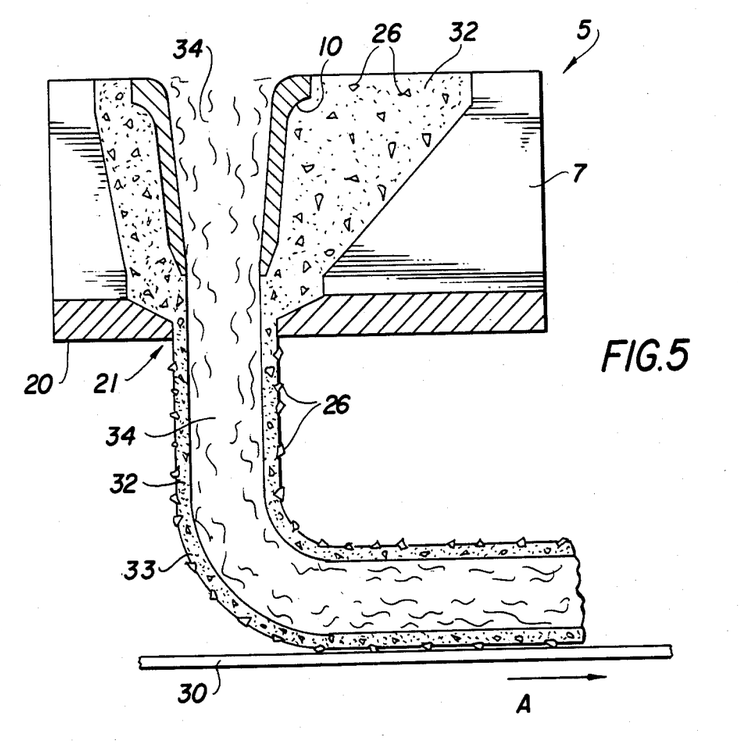
FIG. 5 is a schematic side view, partially in cross-section, similar to FIGS. 1 and 3.

As shown in FIGS. 3 and 5, particulate material, such as chocolate chips, are disposed in the outer doughy mass. Means are provided to tumble the particulate material of the outer doughy mass of the rope-like extrudate so that at least a portion of the particulate material penetrates the exterior surface of outer doughy mass portion. Further, means are provided whereby partial covering of the particles penetrating the exterior surface of the outer portion of the co-extruded product are removed.

Figure 2:
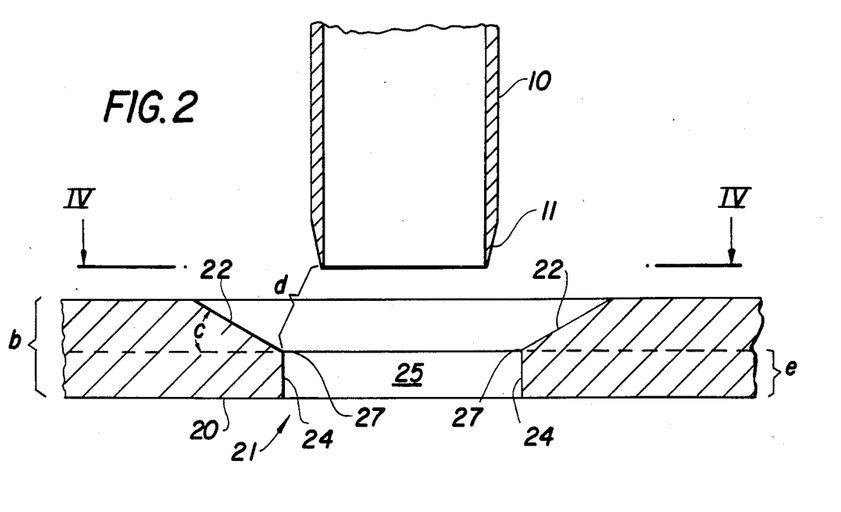
FIG. 2 is a simplified schematic cross-sectional view similar to FIG. 1 of a co-extrusion apparatus incorporating the improvement in accordance with the present invention.

As illustrated in FIGS. 1, 2 and 3, outer extrusion port 21 having an orifice 25 is formed in bottom die plate 20 and includes land surface 24 and a bevel surface 22 on the interior side of outer extrusion port 21. Land surface 24 intersects bevel surface to form an intersection line or edge 27. Land surface 24 is a peripheral surface of outer extrusion port 21 and extends parallel to the axis thereof. Bevel surface 22 is located on the inner or interior side of outer extrusion port 21 (i.e., upstream of land surface 24 with respect to the direction of extrusion along the axis of the outer extrusion port). Bevel surface 22 extends around the perimeter of outer extrusion port 21.

The turbulence inducing means comprises bevel surface 22 and edge 27. It is important that edge 27 be substantially sharp in order to induce turbulence in particulate matter 26 of outer dough 32. By substantially sharp meant that edge 27 may have a very small radius. It is important, however, that edge 27 not have a large radius, because a large radius will not create the desired turbulence in the outer dough 32 and the tumbling of the particulate material 26 and, therefore, satisfactory penetration of the exterior surface 33 of the composite rope-like product 35 will not be achieved.

Land surface 24 serves to remove partial dough covering or dough skin from the particulate material 26 which penetrates the outer dough surface 33 of the outer dough. The length of land surface 24 must be sufficient to substantially remove any partial dough covering or skin from the particulate material 26 which penetrates the outer exterior surface 33 of the outer dough. However, land surface 24 should not be so long as to push particulate material 26 back into the dough.

As shown in FIG. 2, inner extrusion port 11 of filler tube 10 is recessed from outer extrusion port 21 a distance d. This recessing defines an exit passage 28 through which the outer doughy mass passes as it begins to envelop the inner doughy mass 34 exiting inner extrusion port 11. Distance d is of a size to permit particulate material 26 contained in the outer dough 32 to pass through exit passage 28 without clogging or agglomeration.

Advantageously, distance d is selected to be at least about 1.25 times the maximum dimension of the largest particles 26 disposed in outer doughy mass 32. In most applications, d would not exceed 2 times the maximum particle size because as d gets larger the cross-sectional area of orifice 25 tends to increase rapidly and the thickness of the outer doughy mass 32 would concomitantly increase with respect to the thickness of inner doughy mass 34 and not result in a desirable commercial product. It will be understood that the distance d is not defined by randomly over-size particles which do not conform to the intended commercial particle size or grade. In general, the closest distance d from the inner extrusion port 11 to the outer extrusion port 21 is about 5/16 inch to about 7/16 inch with 5/16 inch being satisfactory in many applications.

Bottom die plate 20 may be fabricated from a single molded or machined material, as illustrated in FIG. 2, or it may be fabricated from an inside plate bonded in combination with an outside plate of same or different material, the inside plate bearing bevel surface 22 and the outside plate providing land surface 24, as illustrated in FIG. 3. In either case, edge 27 will be formed at the intersection of bevel surface 22 and land surface 24.

Figure 4:
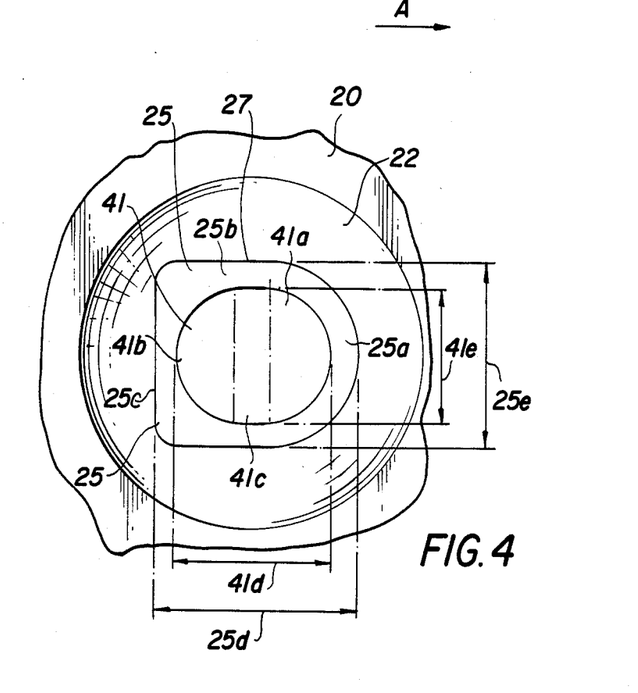
FIG. 4 is a plan view taken along line IV—IV in FIG. 2.

As illustrated in FIG. 4. inner extrusion port 11 has an exit orifice 41 with a generally oval cross-section preferably taking the form of a pair of semicircular end portions 41a and 41b joined by a central rectangular portion 41c. Filler tube 10 may have a generally oval cross-sectional shape conforming to exit orifice 41.

In accordance with the present invention, outer exit orifice 25 has a generally D-shaped cross-section including a semicircular portion 25a and a generally rectangular portion 25b. Exit orifice 25 is defined in part by a straight edge or boundary line 25c. Boundary line 25c and semicircular portion 25a of outer exit opening 25 are located on upstream and downstream sides of the outer extrusion port 21, as defined by the direction of motion of conveyor 30 (arrow A). Similarly, semicircular portions 41b and 41a are located on the conveyor upstream and conveyor downstream sides of rectangular central portion 41c, respectively. Boundary line or edge 25c extends perpendicularly to the direction of motion (arrow A) of conveyor 30, or, more particularly, perpendicularly to the center line or direction of motion of conveyor 30 in an orthographic projection of exit orifice 25 onto the plane of conveyor 30. This geometric relationship holds even in the event that conveyor 30 does not extend parallel to the lower surface of plate 20 (see FIG. 1) but rather at an angle thereto.

As illustrated in FIG. 4, inner exit orifice 41 has a length 41d measured from the conveyor upstream side to the conveyor downstream side and a width 41e measured perpendicularly to the length dimension. Similarly, outer exit orifice 25 has a length 25d measured in the direction of motion of conveyor 30 and a width 25e measured perpendicularly to lengths 25d and 41d. In a preferred embodiment of the invention the length 41d and width 41e of inner exit orifice 41 are approximately 0.687 inch and 0.562 inch, respectively, while the length 25d and width 25e of outer exit orifice 25 are 0.844 inch and 0.750 inch, respectively. In this particular embodiment of the invention, inner exit orifice 41 has a cross-sectional area of 0.318 square inch and outer exit orifice 25 has a cross-sectional area of 0.571 square inch. In accordance with the present invention, the linear dimensions of the exit orifices may be varied within limits, while keeping the cross-sectional areas approximately constant. Although the cross-sectional areas may be modified somewhat, it is desirable that they not extend beyond the range of 0.530 square inch to 0.580 square inch for outer exit orifice 25 or beyond the range of 0.300 square inch to 0.330 square inch for inner exit orifice 41.

In accordance with the embodiment of the present invention illustrated in FIG. 4, the lower edge of bevel surface 22, i.e., intersection line or edge 27, has a D-shape, while the upper edge of bevel surface 22 has a circular shape. The D-shaped exit orifice may be formed by first machining a circular bore in bottom plate 20, forming bevel surface 22 and then expanding or modifying one side of the exit orifice to form a generally rectangular shape.

Figure 6:
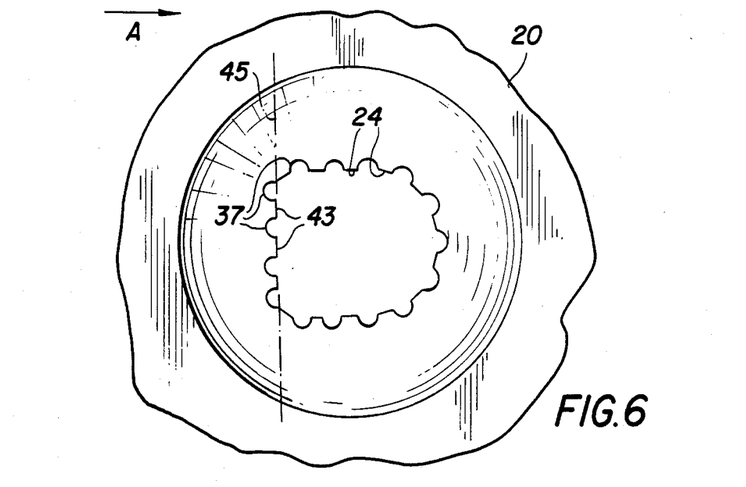
FIG. 6 is a plan view similar to FIG. 4, showing another embodiment of the improvement in accordance with the present invention.

As illustrated in FIG. 6, land surface 24 of outer extrusion port 21 may be provided with a multiplicity of longitudinal scallops 37, i.e., scallops extending in the direction of the axis of outer extrusion port 21. At the upstream side of exit orifice 41, as defined by the direction of motion A of conveyor 30, scallops 37 interrupt the straight line boundary of the exit orifice cross-section to form a plurality of co-linear line segments 43 which define a straight base line 45 extending substantially perpendicularly to the direction of motion of conveyor 30 in an orthographic projection of outer exit orifice 25 onto the conveyor.

A rope-like extrudate produced by a co-extrusion apparatus with the exit orifice cross-sections illustrated in FIGS. 4 and 6 has a D-shaped outer profile with a flat surface on the upstream side, as defined by the direction of motion A of conveyor 30. This flat surface engages the surface of the conveyor upon the deposition of the extrudate mass on the conveyor, whereby the rope-like extrudate material assumes a substantially uniform position with respect to the conveyor along the length thereof.

Operation of a co-extrusion apparatus incorporating the present invention may be described in conjunction with FIG. 3 and FIG. 5. An inner dough 34 is fed under pressure through filler tube or inner extrusion conduit 10 by an auger or gas pressure. An outer dough 32 which is dissimilar to the inner dough 34 is fed under pressure through outer extrusion conduit 23, the outer dough 32 containing particulate material 26. The inner dough 34 exits inner extrusion port 11 and is enveloped by the outer dough 32 which passes through exit passage 28. The inner dough 34 enveloped by the outer dough 32 then passes through the outer extrusion port 21. The particulate material 26 in outer dough 32 is caused to tumble as outer dough passes over bevel surface 22 and intersection edge 27.

At least a portion of the tumbling particles of particulate material 26 will partially break through exterior surface 33 of outer doughy mass 32 as the inner doughy mass 34 and the outer doughy mass 32 co-extruded product passes through exit orifice 25. Land surface 24 substantially removes partial dough coverings or skin from the projecting particulate matter 26. It will be appreciated that a portion of the particulate material 26 will remain embedded within the outer doughy mass 32. However, a sufficient amount of particles of the particulate material 26 will be tumbled at or near the surface of the outer doughy mass to render the desired appearance to the extruded dough rope-like product 35.

Rope-like product 35 exits the outer extrusion port 21 and is received and transported away by horizontally disposed conveyor 30. Typically, product 35 would be cut into individual portions by any convenient cutting means well known in the art such as a vertically reciprocating cylindrical cutter having a blunt circular cutting edge. The cut portions of the rope-like product would be further transported to an oven for baking.

The operating of a co-extrusion apparatus incorporating the present invention would most advantageously be carried out continuously in an automated process. The composite rope-like product 35 may be extruded at a rate as low as about 2 feet per minute and the desired tumbling effect will be achieved. The maximum speed of extrusion of the rope-like product 35 may be typically 35 feet per minute. The maximum speed of extrusion of the rope-like product 35 is determined by practical consideration such as the size of the oven and the avoidance of tears in the outer dough 32 of the composite rope-like product 35. In general, the conveyor means 30 carries away the co-extruded composite dough rope-like product 35 at a speed equal to or just slightly greater than the speed of extrusion so that the rope-like product 35 is oriented in the direction of travel of the conveyor means 30 but is not overly extended so as to cause unsightly discontinuities in the outer dough portion.

A co-extrusion apparatus incorporating the improvement of the present invention is highly advantageous for the automated manufacture of chocolate chip cookies having a dissimilar inner dough and outer dough and wherein the finished product has a commercially desirable handmade appearance. The inner dough 34 can be a chocolate chip cookie dough with or without chocolate chips, while the outer dough 32 can also be a chocolate chip cookie dough, suitably dissimilar to the inner dough and could contain chocolate chips. Suitably, the inner dough can contain a humectant in order to render the finished product with a moist and chewy inner texture after baking. The outer dough can be a normal chocolate chip cookie dough which takes on a crispy brown appearance and texture after baking.

The size of the chocolate chips, i.e., the particulate matter 26, in the outer dough mass 32 can be of the size which provides from about 1,500 chips per pound to about 10,000 chips per pound. An advantageous chip size is about 4,600 chips per pound to about 5,000 chips per pound with about 4,800 chips per pound being a particularly desirable chip size. The concentration of chocolate chips in the outer dough 32 at the exit passage 28 may be from about 3% to about 40% by weight based on the dough and is suitably about 7% to about 20% by weight. A concentration of chocolate chips of about 15% by weight based on the dough has been found useful. A co-extrusion apparatus incorporating the present invention is particularly useful for the manufacture of chocolate chip cookies. The inner dough may or may not contain chocolate chips.

Although preferred embodiments of the improvement of the present invention have been described in detail, it is contemplated that changes and modifications may be made thereto by one skilled in the art all within the spirit and scope of the present invention as described herein and as defined in the appended claims.

What is claimed is:

1. In a co-extrusion apparatus for forming a continuous food product having dissimilar inner and outer portions wherein said inner portion is enveloped by said outer portion and said outer portion is a dough, said apparatus comprising an inner extrusion port, an outer extrusion port, first conduit means, second conduit means and transport means, said inner extrusion port having an inner exit orifice with a first cross-sectional area through which said inner portion is extruded, said outer extrusion port having an outer exit orifice with a second cross-sectional area greater in area than said first cross-sectional area, said inner extrusion port being located entirely within said outer extrusion port and spaced from said outer extrusion port to define an exit passage between said inner extrusion port and said outer extrusion port, said first conduit means communicating with said inner extrusion port for providing said inner portion, said second conduit means communicating with said outer exit passage for providing said outer portion, whereby said outer dough portion passes through said exit passage and envelops said inner portion extruded through said inner extrusion port, said transport means including a continuously moving conveyor for receiving said food product upon extrusion through said inner and said outer extrusion port, the motion of said conveyor past said inner extrusion port and said outer extrusion port defining an upstream side and a downstream side with respect to said inner extrusion port and said outer extrusion port, the improvement wherein the inner extrusion port and the outer extrusion port are oriented to extrude the continuous food product substantially perpendicularly to the plane of the transport means; and the outer exit orifice has a cross-section with a first portion defining a straight base line at the upstream side and a second portion defining a curve at the downstream side, whereby the food product is provided with a cross-section facilitating the position of the food product on the conveyor.

2. The improvement defined in claim 1 wherein said straight base line extends substantially perpendicularly to the direction of motion of said conveyor in an orthographic projection of said outer exit orifice onto said conveyor.

3. The improvement defined in claim 2 wherein the cross-section of said outer exit orifice is D-shaped.

4. The improvement defined in claim 3 wherein the inner exit orifice has a generally oval cross-section having a length dimension and a width dimension measured substantially perpendicularly to said length dimension, said length dimension being larger than said width dimemsion and being measured in a direction extending from said upstream side to said downstream side.

5. The improvement defined in claim 4 wherein the cross-section of said outer exit orifice has a length dimension and a width dimension measured substantially perpendicularly to said length dimension, the length dimension of said outer exit orifice being larger than the width dimension of said outer exit orifice and being larger than the length dimension of said inner exit orifice, the length dimension of said outer exit orifice being measured from said upstream side to said downstream side, the width dimension of said outer exit orifice being larger than the width dimension of said inner exit orifice.

6. The improvement defined in claim 5 wherein the width dimension of said outer exit orifice is larger than the length dimension of said inner exit orifice.

7. The improvement defined in claim 4 or 5 wherein the cross-section of said inner exit. orifice has a pair of semicircular end portions joined by a rectangular center portion.

8. The improvement defined in claim 7 wherein the cross-section of said outer exit orifice has a semicircular end portion on the downstream side and a substantially rectangular portion on the upstream side.

9. The improvement defined in claim 4 or 5 wherein the inner cross-sectional area is between 0.300 square inch and 0.330 square inch and wherein the outer cross-sectional area is between 0.530 square inch and 0.580 square inch.

10. The improvement defined in claim 9 wherein said inner cross-sectional area is approximately 0.318 square inch and said outer cross-sectional area is approximately 0.571 square inch.

11. The improvement defined in claim 10 wherein the length dimension and the width dimension of said inner exit orifice are approximately 0.687 inch and 0.562 inch, respectively, and wherein the length dimension and the width dimension of said outer exit orifice are approximately 0.844 inch and 0.750 inch, respectively.

12. In an extrusion apparatus for forming a continuous food product, said apparatus comprising an extrusion port with an exit orifice and a continuously moving conveyor for receiving said food product upon extrusion through said extrusion port, the motion of said conveyor defining an upstream side and a downstream side with respect to said extrusion port, and said extrusion port being oriented substantially perpendicular to said conveyor, the imporvement wherein the exit orifice has a cross-section with a first portion defining a straight base line at the upstream side and a second portion defining a circular arc at the downstream side, whereby the food product is provided with a cross-section facilitating the positioning of the food product on the conveyor.

13. The improvement defined in claim 12 wherein said straight base line extends substantially perpendicularly to the direction of motion of said conveyor in an orthographic projection of said exit orifice onto said conveyor.

* * * * *

UNITED STATES PATENT AND TRADEMARK OFFICE
CERTIFICATE OF CORRECTION

PATENT NO. : 4,648,821

DATED : March 10, 1987

INVENTOR(S) : Robert THULIN

It is certified that error appears in the above-identified patent and that said Letters Patent is hereby corrected as shown below:

```
     In the specification, Column 4, line 41, change "with
further" to --with a further--.
Column 6, line 2, change "11 respect" to --11 with respect--.
Column 6, line 25, change "surface" to --surface 22--.
Column 6, line 38, change "meant" to --it is meant--.
Column 8, line 46, change "dough" to --dough 32--.
     In the claims, Claim 7, line 2, delete the period shown
therein.
Claim 12, line 4, rewrite "imporvement" as --improvement--.
```

Signed and Sealed this
Twenty-seventh Day of October, 1987

Attest:

DONALD J. QUIGG

*Attesting Officer*   *Commissioner of Patents and Trademarks*